United States Patent
Wang et al.

(10) Patent No.: US 11,263,805 B2
(45) Date of Patent: Mar. 1, 2022

(54) METHOD OF REAL-TIME IMAGE PROCESSING BASED ON RENDERING ENGINE AND A DISPLAY APPARATUS

(71) Applicants: BEIJING BOE OPTOELECTRONICS TECHNOLOGY CO., LTD., Beijing (CN); BOE Technology Group Co., Ltd., Beijing (CN)

(72) Inventors: Xuefeng Wang, Beijing (CN); Wenyu Li, Beijing (CN); Jinghua Miao, Beijing (CN); Bin Zhao, Beijing (CN); Yukun Sun, Beijing (CN); Lixin Wang, Beijing (CN); Xi Li, Beijing (CN); Yuanjie Lu, Beijing (CN); Jianwen Suo, Beijing (CN); Jinbao Peng, Beijing (CN); Qingwen Fan, Beijing (CN); Zhifu Li, Beijing (CN); Hao Zhang, Beijing (CN); Lili Chen, Beijing (CN)

(73) Assignees: BEIJING BOE OPTOELECTRONICS TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 282 days.

(21) Appl. No.: 16/483,724

(22) PCT Filed: Nov. 21, 2018

(86) PCT No.: PCT/CN2018/116723
§ 371 (c)(1),
(2) Date: Aug. 5, 2019

(87) PCT Pub. No.: WO2020/103036
PCT Pub. Date: May 28, 2020

(65) Prior Publication Data
US 2021/0407180 A1    Dec. 30, 2021

(51) Int. Cl.
*G06T 3/20* (2006.01)
*G06T 15/20* (2011.01)
(Continued)

(52) U.S. Cl.
CPC ............ *G06T 15/205* (2013.01); *G06T 15/04* (2013.01); *G06T 15/80* (2013.01); *G06T 17/20* (2013.01);
(Continued)

(58) Field of Classification Search
None
See application file for complete search history.

(56) References Cited

U.S. PATENT DOCUMENTS

| | | | | |
|---|---|---|---|---|
| 10,621,932 B1 * | 4/2020 | Su | ............................. | G09G 5/02 |
| 2004/0145599 A1 * | 7/2004 | Taoka | ........................ | G09G 5/28 |
| | | | | 345/698 |

(Continued)

FOREIGN PATENT DOCUMENTS

| CN | 101140375 A | 3/2008 |
|---|---|---|
| CN | 102722861 A | 10/2012 |

(Continued)

OTHER PUBLICATIONS

International Search Report & Written Opinion dated Jun. 24, 2019, regarding PCT/CN2018/116723.

*Primary Examiner* — Sultana M Zalalee
(74) *Attorney, Agent, or Firm* — Intellectual Valley Law, P.C.

(57) ABSTRACT

The present application discloses method for real-time processing image data based on a rendering engine. The method includes sampling a first set of data in a first pixel arrangement to be displayed as an image in a display screen with pixels in a second pixel arrangement. The method further includes creating a first model mapped with the first set of (Continued)

data to generate a second set of data and a second model mapped with the first set of data to generate a third set of data. Additionally, the method further includes rendering the second set of data using a first shader to output a fourth set of data and rendering the third set of data using a second shader to output a fifth set of data. Furthermore, the method includes superimposing the fourth set of data over the fifth set of data to display a sixth set of data.

20 Claims, 5 Drawing Sheets

(51) Int. Cl.
    *G06T 15/80*     (2011.01)
    *G06T 19/20*     (2011.01)
    *G06T 15/04*     (2011.01)
    *G06T 17/20*     (2006.01)

(52) U.S. Cl.
    CPC ...... *G06T 19/20* (2013.01); *G06T 2219/2012* (2013.01)

(56) References Cited

U.S. PATENT DOCUMENTS

| | | | | |
|---|---|---|---|---|
| 2004/0239657 | A1* | 12/2004 | Kempf | G09G 3/20 345/204 |
| 2005/0259114 | A1* | 11/2005 | Belmon | G09G 3/3607 345/613 |
| 2006/0087556 | A1* | 4/2006 | Era | H04N 13/359 348/51 |
| 2008/0055500 | A1 | 3/2008 | Maeda | |
| 2010/0001939 | A1 | 1/2010 | Ochiai et al. | |
| 2010/0118045 | A1* | 5/2010 | Brown Elliott | G09G 3/20 345/589 |
| 2011/0044555 | A1* | 2/2011 | Swanson | H04N 1/3876 382/275 |
| 2012/0274651 | A1* | 11/2012 | Hass | G09G 3/20 345/589 |
| 2013/0021328 | A1* | 1/2013 | Yang | G09G 3/3208 345/419 |
| 2015/0287232 | A1* | 10/2015 | Cerny | G06T 15/04 345/501 |
| 2017/0345353 | A1* | 11/2017 | Lin | G09G 3/2074 |
| 2018/0012534 | A1* | 1/2018 | Park | G02B 30/26 |
| 2019/0073941 | A1 | 3/2019 | Xi et al. | |

FOREIGN PATENT DOCUMENTS

| | | |
|---|---|---|
| CN | 103593862 A | 2/2014 |
| CN | 106707532 A | 5/2017 |
| CN | 106920501 A | 7/2017 |
| CN | 107068035 A | 8/2017 |
| CN | 107342037 A | 11/2017 |

* cited by examiner

```
float4 frag(v2f i) :SV_Target
{
    fixed4 col = tex2D(_MainTex, i.uv);
    col = fixed4(col.b, col.r, col.g, col.a);
    return col;
}
```

FIG. 6

METHOD OF REAL-TIME IMAGE PROCESSING BASED ON RENDERING ENGINE AND A DISPLAY APPARATUS

CROSS-REFERENCE TO RELATED APPLICATION

This application is a national stage application under 35 U.S.C. § 371 of International Application No. PCT/CN2018/116723, filed Nov. 21, 2018, the contents of which are incorporated by reference in the entirety.

TECHNICAL FIELD

The present invention relates to image processing technology, more particularly, to a method of real-time image processing based on rendering engine, a real-time image process apparatus, and a display apparatus implementing the method.

BACKGROUND

Modern display technologies such as display products of virtual reality (VR) or augmented reality (AR) require real-time image processing while displaying static images or video images. Rendering engine is just one real-time image processor associated with these display products to process image data in real time and output the processed image data in terms of a virtual scene that can be sampled to the display screen to display. Also, higher image resolution is always demanded for these products.

SUMMARY

In an aspect, the present disclosure provides a method for real-time processing image data based on a rendering engine. The method includes sampling a first set of data in a first pixel arrangement to be displayed as an image in a display screen with pixels in a second pixel arrangement. The method further includes mapping the first set of data to a first model for a rendering engine to generate a second set of data and mapping the first set of data to a second model for the rendering engine to generate a third set of data. Additionally, the method includes loading the second set of data and the third set of data to the rendering engine and processing the second set of data by the rendering engine using a first shader associated with the first pixel arrangement to output a fourth set of data. The method further includes processing the third set of data by the rendering engine using a second shader associated with the second pixel arrangement to output a fifth set of data. Furthermore, the method includes superimposing the fourth set of data over the fifth set of data to obtain a sixth set of data. Moreover, the method includes displaying the sixth set of data in the display screen with pixels in the second pixel arrangement.

Optionally, the method further includes creating the first model and the second model for the rendering engine based on the display screen. The step of creating the first model includes generating a first number of rectangular stripe bodies each having a first width of a pixel and a first length of one row of second number of pixels and being separated from neighboring rectangular stripe body by one row of pixels. The first number and the second number respectively represent half of a vertical display resolution and half of a lateral display resolution associated with the display screen. The second model is characterized by a rectangular body corresponding to the display screen with a second width equal to the first length of one row of pixels and a second length equal to a sum of first widths of two times of the first number of rows of pixels.

Optionally, the step of sampling the first set of data includes collecting the first set of data in real time using a sampling camera associated with the rendering engine.

Optionally, the sampling camera includes an orthogonal projection camera or a perspective projection camera.

Optionally, the step of mapping the first set of data to the first model to generate the second set of data includes generating a first virtual image with a first edge aligned with a first one of the first number of rectangular stripe bodies of the first model by transforming the first set of data to the second set of data in terms of UV mapping. The step of mapping the first set of data to the second model to generate the third set of data includes generating a second virtual image attached to a single rectangular body of the second model by transforming the first set of data to the third set of data in terms of UV mapping.

Optionally, loading the second set of data and the third set of data to the rendering engine includes generating a first Filmbox (FBX) file bearing at least information of the second set of data associated with the first model and a second FBX file bearing at least information of the third set of data associated with the second model respectively loaded into the rendering engine.

Optionally, the method further includes creating the first shader associated with the first pixel arrangement. The step of creating the first shader includes defining one or more computer-executable treatments on image data in the first pixel arrangement in which each row of pixels is arranged in real RGB subpixel order.

Optionally, the step of processing the second set of data includes rendering the first virtual image by the rendering engine. The step of processing the second set of data further includes adjusting colors, textures, and mesh information on the second set of data associated with the fast model by the first shader to obtain the fourth set of data in the first pixel arrangement.

Optionally, the method further includes creating the second shader associated with the second pixel arrangement. The step of creating the second shader includes defining one or more computer-executable treatments on image data in the second pixel arrangement in which a number of each row of pixels is half of that in the first pixel arrangement, each odd numbered row of pixels is kept at real RGB subpixel order as in the first pixel arrangement, and each even numbered row of pixels is changed to BRG subpixel order and each subpixel of one color in the even numbered row is shifted to a position between two nearest subpixels of two different colors in the odd numbered row.

Optionally, the step of processing the third set of data includes rendering the second virtual image by the rendering engine and adjusting colors, textures, and mesh information on the third set of data associated with the second model by the second shader to obtain the fifth set of data in the second pixel arrangement.

Optionally, the step of superimposing the fourth set of data over the fifth set of data to obtain a sixth set of data includes combining all fourth set of data in odd numbered rows of pixels and all fifth set of data in even numbered rows of pixels to effectively obtain the sixth set of data to generate a virtual scene in the rendering engine. The step of superimposing the fourth set of data over the fifth set of data to obtain a sixth set of data further includes sampling the sixth set of data in the second pixel arrangement out of the virtual scene in real time using a sampling camera associated with the rendering engine.

Optionally, the step of displaying the sixth set of data in the display screen includes sending the sixth set of data in the second pixel arrangement with half lateral display resolution of the display screen and displaying an image in the display screen with fill display resolution.

In another aspect, the present disclosure provides a real-time image processing apparatus. The apparatus includes a memory and one or more processors. The memory and the one or more processors are connected with each other. The memory stores computer-executable instructions for controlling the one or more processors to sample a first set of data in a first pixel arrangement to be displayed as an image in a display screen with pixels in a second pixel arrangement; to map the first set of data to a first model for a rendering engine to generate a second set of data; to map the first set of data to a second model for the rendering engine to generate a third set of data; to load the second set of data and the third set of data to the rendering engine; to process the second set of data by the rendering engine using a first shader associated with the first pixel arrangement to output a fourth set of data; to process the third set of data by the rendering engine using a second shader associated with the second pixel arrangement to output a fifth set of data; and to superimpose the fourth set of data over the fifth set of data to obtain a sixth set of data.

Optionally, the one or more processors includes a rendering engine, a first shader, and a second shader. The rendering engine includes at least a sampling camera for sampling the first set of data and is configured to receive a first model via a first Filmbox (FBX) file. The first model is created by an external model builder and the first FBX file includes information of a first virtual image attached to the first model based on the second set of data transformed from the first set of data through UV mapping. The rendering engine is configured to receive a second model via a second FBX file. The second FBX file includes a second virtual image attached to the second model based on the third set of data transformed from the first set of data through UV mapping.

Optionally, the first model is generated by the external model builder based on a rectangular body corresponding to the display screen as a first number of rectangular stripe bodies each having a first width of a pixel and a first length of one row of second number of pixels and being separated from neighboring rectangular stripe body by one row of pixels. The second model is characterized by a rectangular body corresponding to the display screen with a second width equal to the first length of one row of pixels and a second length equal to a sum of first widths of two times of the first number of rows of pixels. The first number and the second number respectively represent half of a vertical display resolution and half of a lateral display resolution associated with the display screen.

Optionally, the rendering engine includes one or more computer-executable instructions to render the second set of data to form a first virtual image based on the first model and to render the third set of data to form a second virtual image based on the second model.

Optionally, the first shader includes one or more computer-executable instructions to adjust colors, textures, and mesh information on the first virtual image to obtain the fourth set of data in the first pixel arrangement in which each row of pixels is arranged in real RGB subpixel order.

Optionally, the second shader includes one or more computer-executable instructions to adjust colors, textures, and mesh information on the second virtual image to obtain the fifth set of data in the second pixel arrangement in which a number of each row of pixels is half of that in the first pixel arrangement, each odd numbered row of pixels is kept at real RGB subpixel order as in the first pixel arrangement, and each subpixel of one color in an even numbered row is shifted to a position between two subpixels of two different colors in the odd numbered row.

Optionally, the one or more processors further includes one or more computer-executable instructions to superimpose the fourth set of data over the fifth set of data to produce a sample image with all odd numbered rows of pixels produced by the fourth set of data and all even numbered rows of pixels produced by the fifth set of data. The one or more processors further includes one or more computer-executable instructions to output the sixth set of data to the display screen in the second pixel arrangement to display an image with a lateral display resolution being two times of a physical resolution of the second number of pixels per row and a vertical display resolution being same as a physical resolution of the first number of rows of pixels in the display screen.

In yet another aspect, the present disclosure provides a display apparatus including a display screen coupling to the real-time image processing apparatus described herein.

In still another aspect, the present disclosure provides a computer product including a non-transitory tangible computer-readable medium having computer-readable instructions thereon. The computer-readable instructions are executable by a processor to cause the processor to perform following steps including sampling a first set of data in a first pixel arrangement to be displayed in real time as an image in a display screen with pixels in a second pixel arrangement; mapping the first set of data to a first model for a rendering engine to generate a second set of data; mapping the first set of data to a second model for the rendering engine to generate a third set of data; loading the second set of data and the third set of data to the rendering engine; processing the second set of data by the rendering engine using a first shader associated with the first pixel arrangement to output a fourth set of data; processing the third set of data by the rendering engine using a second shader associated with the second pixel arrangement to output a fifth set of data; and superimposing the fourth set of data over the fifth set of data to obtain a sixth set of data.

In yet still another aspect, the present disclosure provides a method for real-time processing image data based on a rendering engine. The method includes creating a display model based on a display panel with a first pixel arrangement for the rendering engine and a shader associated with the rendering engine for writing data with the first pixel arrangement. Additionally, the method includes sampling a first set of image data with a second pixel arrangement in real time from a scene based on the first set of image data in the rendering engine. The method further includes rendering the first set of image data based on the display model by the rendering engine and the shader to obtain a second set of image data with the first pixel arrangement. Furthermore, the method includes sampling the second set of image data with the first pixel arrangement in real time from a scene based on the second set of image data in the rendering engine. Moreover, the method includes outputting the second set of image data to the display panel to display an image.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

One technique for improving display image resolution has been proposed to rearrange the pixel arrangement in a display screen so that using less number of pixels arranged on the display screen to achieve higher display resolution for the images displayed. It is typically required to add a physical image-processing circuit directly to a driver integrated circuit (Driver IC) of the display screen to treat the image data before displaying image in the display screen that has been rearranged with the pixel arrangement. Yet an improved technique of performing real-time image data process is desired for displaying the image in the display screen with the rearranged pixel arrangement.

Figure 1:
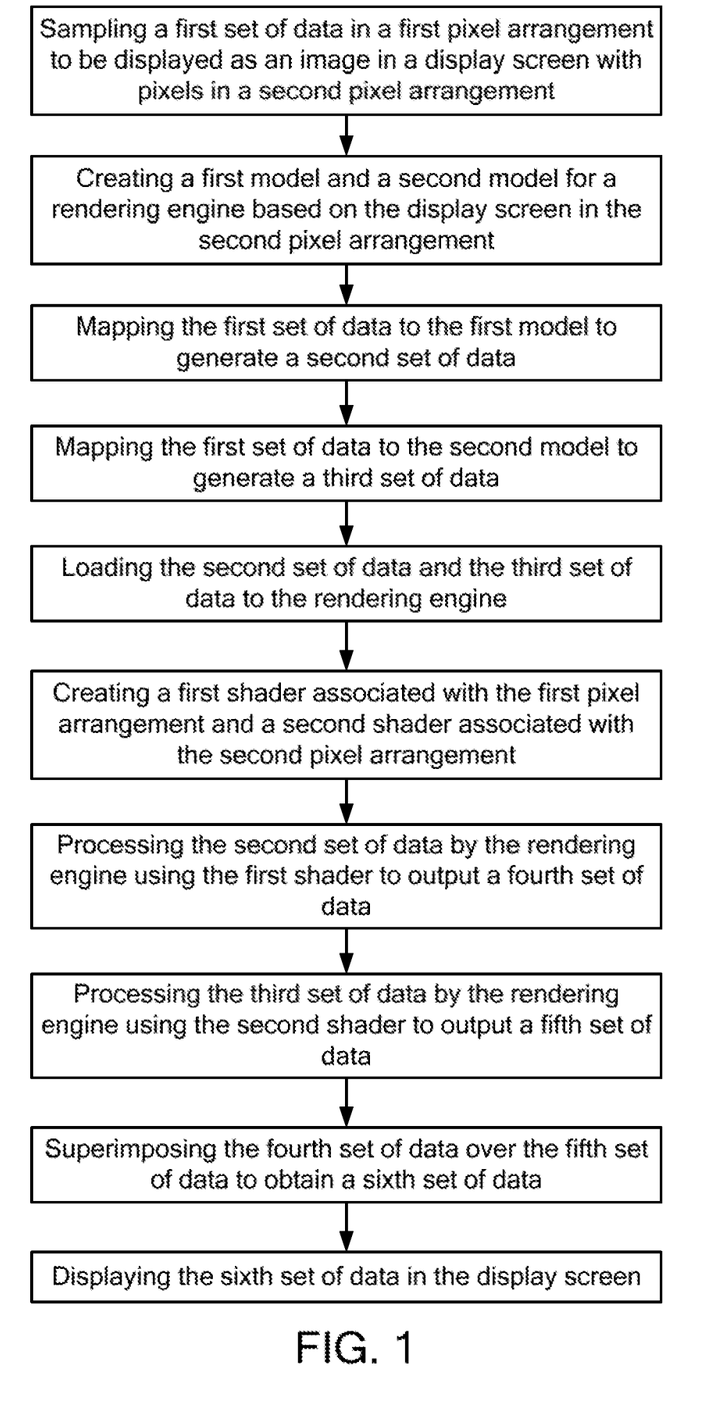
FIG. 1 is a flow chart showing a method for processing image data in real time to be displayed in a display screen according to some embodiments of the present disclosure.

Accordingly, the present disclosure provides, inter alia, a method for processing image data in real time based on a rendering engine, a real-time image process apparatus having the same, and a display apparatus thereof that substantially obviate one or more of the problems due to limitations and disadvantages of the related art. In one aspect, the present disclosure provides a method for processing image data in real time based on a rendering engine associated with a display screen that has been rearranged in its pixel arrangement for improving display resolution. FIG. 1 is a flow chart showing a method for processing image data in real time to be displayed in a display screen according to some embodiments of the present disclosure. In the embodiment, the image data, which is originally provided to display in a display screen with pixels in a first (normal) pixel arrangement, is processed in real time by a rendering engine before being provided to display with a same display resolution in a display screen with less number of pixels in a second pixel arrangement.

Referring to FIG. 1, the method firstly includes a step of sampling a first set of data in a first pixel arrangement to be displayed as an image in a display screen with pixels in a second pixel arrangement. Optionally, the first pixel arrangement in the display screen is a regular arrangement of each row of pixels with each pixel being in a RGB subpixel order. In other words, each pixel in each row includes three subpixels in a serial order with one subpixel with red color, followed by another subpixel with green color, and last one subpixel with blue color. Based on the first set of data originally for on a display panel having the first pixel arrangement, the image displayed in the display panel should have a display resolution substantially same as a physical pixel resolution associated with the display panel having the first pixel arrangement. However, for the display screen with pixels rearranged in the second pixel arrangement, the first set of data cannot be used to display the image directly in the display screen because abnormity may be caused to the image displayed due to the pixel re-arrangement. The method of the present disclosure is to process the first set of data in real time under a rendering engine associated with the display screen such that a new set of processed data can be outputted to display the image in the display screen with the second pixel arrangement.

Figure 2:
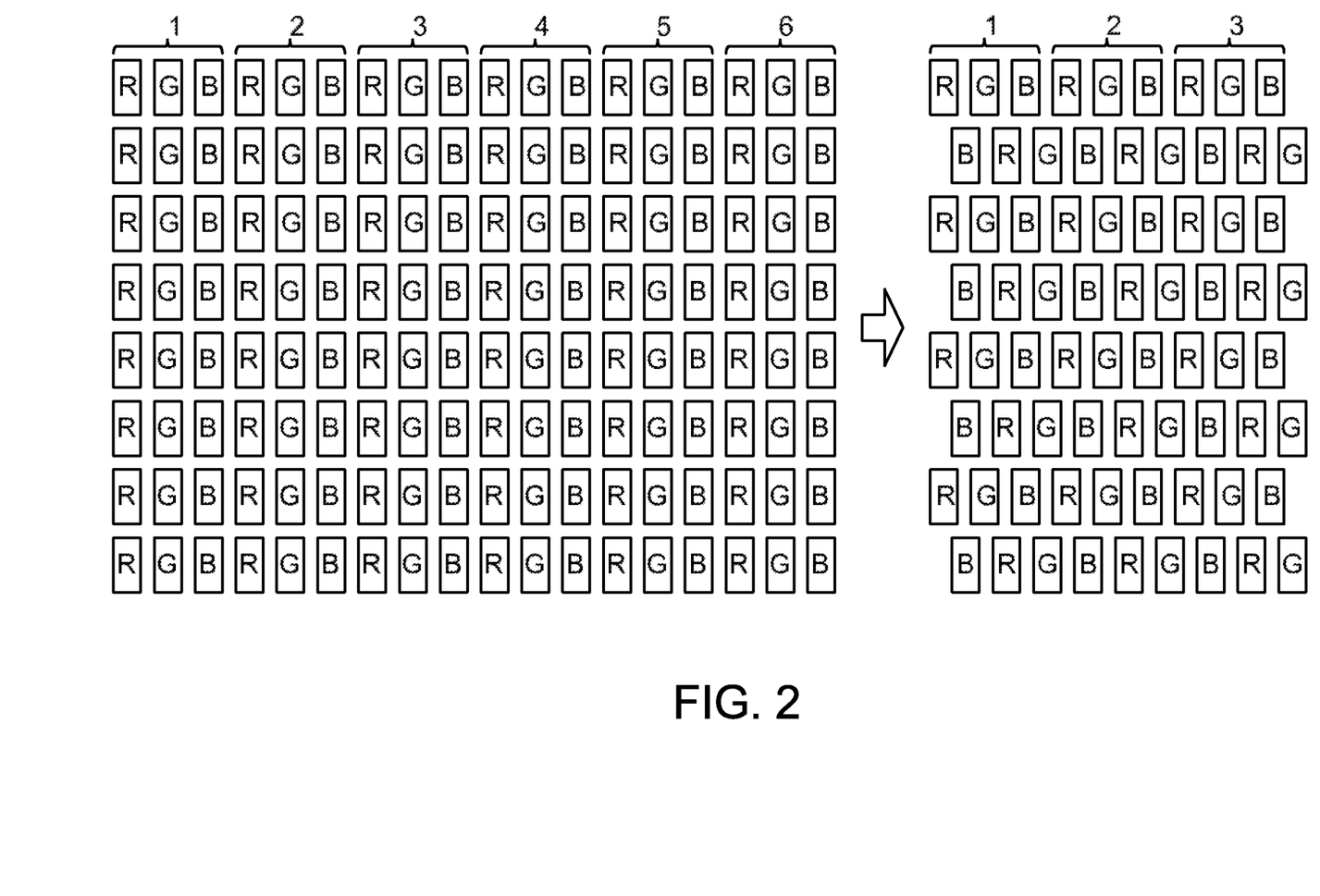
FIG. 2 is a schematic diagram showing a first pixel arrangement is transformed to a second pixel arrangement in a display screen according to some embodiments of the present disclosure.

FIG. 2 shows an example of the first pixel arrangement being re-arranged to a second pixel arrangement. Optionally, the second pixel arrangement is a so-call BV3 pixel arrangement having a lateral physical pixel resolution being a half of that of the first pixel arrangement. Referring to FIG. 2, a first pixel array (on the left) having six columns of pixels arranged in the first pixel arrangement are rearranged to second pixel array (on the right) with three columns of pixels in the second pixel arrangement. Additionally, the odd numbered rows of pixels in the second pixel array is kept in the RGB subpixel order as that in the first pixel arrangement, but the even numbered rows of pixels in the second pixel array is changed to be in a BRG subpixel order, and each subpixel of one color in the even numbered row is shifted to a position between two nearest subpixels of two different colors in the odd numbered row. In an specific embodiment, gray-scale levels of the six columns of pixels in the first arrangement according to the original image can be converted to scaled gray-scale levels of three columns of pixels in the second pixel arrangement, then the actual pixels of the display screen are assigned with the respective scaled gray-scale levels to display the image that has a same display resolution as the original image. Effectively, the display screen with the second pixel arrangement achieves a display resolution twice or higher than the physical pixel resolution. Optionally, the above gray-scale level conversion associated with the pixel arrangement can be achieved through an addition of data signal processor within a driver integrated circuit (driver IC) to provide scaled gray-scale levels to drive the pixels of the display screen. Optionally, the above gray-scale level conversion associated with the pixel arrangement can be achieved through a data treatment via a virtual rendering engine associated with the display screen without need to alter the driver IC.

Figure 3:
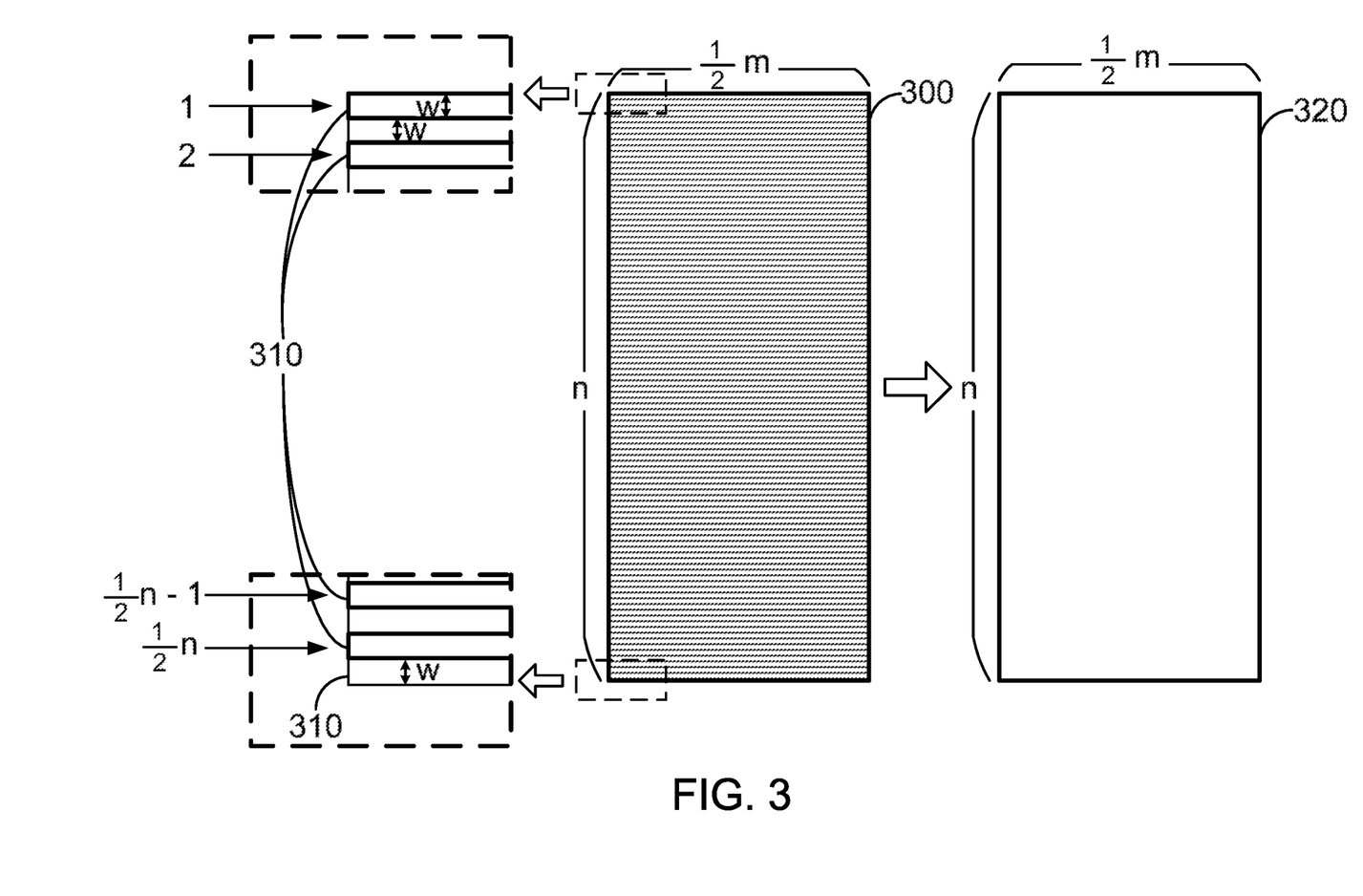
FIG. 3 is a schematic diagram showing a first model (left) and a second model (right) for a rendering engine associated with a display screen with pixels in the second pixel arrangement according to an embodiment of the present disclosure.

Referring back to FIG. 1, the method further includes creating a first model and a second model for a rendering engine based on the display screen in the second pixel arrangement. Rendering engine is a collection of various algorithms for calculating or processing image data in a computer based on polygons or various curves to represent a real object in abstractive manner. Typically, the rendering engine is a "3D" rendering engine which is to build a "real world" inside the computer based on which a real-time image process can be achieved, and a set of data can be treated by the 3D rendering engine and outputted to a display screen in real time. In some embodiments, the conversion of original image data associated with the first pixel arrangement to displayable data for display screen in the second pixel arrangement (e.g., BV3 pixel arrangement) is performed under the rendering engine based on the two models as mentioned. FIG. 3 shows a schematic diagram of a first model (left) and a second model (right) for a rendering engine associated with a display screen with pixels in the second pixel arrangement according to an embodiment of the present disclosure.

Optionally, the step of sampling a first set of data in a first pixel arrangement is to collect the first set of data in real time using a sampling camera associated with the rendering engine associated with the display screen. Optionally, the sampling camera is a virtual orthogonal projection camera or a virtual perspective projection camera. Optionally, an image is virtually displayed on the display screen (in the first pixel arrangement) and is projected to a rectangular region from the sampling camera towards a certain direction, from which the gray-scale levels of image data are collected by the sampling camera and saved into a memory of the rendering engine.

Referring to FIG. 1 and FIG. 3, creating the first model and the second model is achieved by using a model builder software externally and executed prior to any rendering operation. In an embodiment, the model builder software, such as 3DsMax, can be used to create the first model based on a display screen which is typically a rectangular shape and characterized by a display resolution with an array of pixels in the second pixel arrangement. In an example, the second pixel arrangement is a BV3 pixel arrangement as described earlier in FIG. 2.

Referring FIG. 3, in a rectangle region 300 corresponding to the display screen, the first model is generated as a first number of rectangular stripe bodies 310 each having a first width of a pixel and a first length of one row of second number of pixels and being separated from neighboring rectangular stripe body by the first width. The second model is characterized by a rectangular body 320 directly corresponding to the display screen with a second width equal to the first length of one row of pixels and a second length equal to a sum of the first widths of two times of the first number of rows of pixels. Referring to FIG. 3, the first width of a row of pixels is denoted as w. The first number mentioned above is denoted as ½·n and the second number is denoted as ½·m, assuming that there are ½·m×n array of pixels in the BV3 pixel arrangement which is configured to display an image with a display resolution in terms of m×n image pixels, twice of a physical resolution of the ½·m×n BV3 pixels. For example, a target display resolution is 1440×2560 using only 720×2560 BV3 pixels. The first length or the second width then is denoted as ½·m. The second length is denoted as n. Therefore, in the first model, a first rectangular stripe body (one denoted as 1 of the ½·n numbers of rectangular stripe bodies 310) is in alignment with a top edge of the rectangle region 300 corresponding to the first row of pixels in the display screen and the last rectangular stripe body (one denoted as ½·n of the ½·n numbers of rectangular stripe bodies 310) is one row (with the first width w) away from a bottom edge of the rectangle region 300 of the display screen.

Referring back to FIG. 1, the method further includes a step of mapping the first set of data to the first model to generate a second set of data and mapping the first set of data to the second model to generate a third set of data. Once the first model is built, a blank frame containing the first number of rectangular stripe bodies 310 is formed. This step is to attach a picture based on the image data saved in the memory onto the blank frame. In particular, a virtual image based on the first set of data is attached to the first number of rectangular stripe bodies. In the embodiment, mapping the first set of data to the first model includes generating a first virtual image based on UV mapping (an image data transforming algorithm in a 3D modeling process of projecting a 2D image to a 3D model's surface for texture mapping) for transforming the first set of data to a second set of data. The first virtual image substantially represents textures attached to all the rectangular stripe bodies of the first model with a first edge of the first virtual image aligned with a first one of the first number of rectangular stripe bodies 310. Once the first virtual image is attached to the rectangular stripe bodies of the first model, the first model becomes a constructed model. Optionally, the step mentioned above can be performed by the model builder software prior to any rendering operation. Once the first model is constructed, the model builder software can output a first FBX file carrying information of the second set of data associated with the constructed first model. The term FBX refers to Filmbox file format. Similarly, once the second model is built, a blank frame of a single rectangular body 320 is formed. Then, the step of mapping the first set of data to the second model to generate the third set of data includes generating a second virtual image which substantially represents textures attached to the single rectangular body 320 of the second model by transforming the first set of data to the third set of data in terms of UV mapping. Once the second model is constructed with the second virtual image being attached to the rectangular body 320, the model builder software can output a second FBX file carrying information of the third set of data associated with the constructed second model. The FBX file is one of several types of image data file formats used in many image processors including the rendering engine. As used herein, the term "UV mapping" refers to a 3D modeling process of projecting a 2D image to a 3D model's surface for texture mapping. The UV map transforms the 3D object onto an image known as a texture.

Referring to FIG. 1, the method for real-time processing image data based on a rendering engine additionally includes a step of loading the second set of data and the third set of data to the rendering engine. In a specific embodiment, the first FBX file and the second FBX file are loaded from the model builder software into the rendering engine respectively to run a rendering operation. In another specific embodiment, the model can be built prior to rendering, but generating the FBX file of the model following the UV mapping based on sampling the original data in real time can be also performed in real time.

Figure 4:
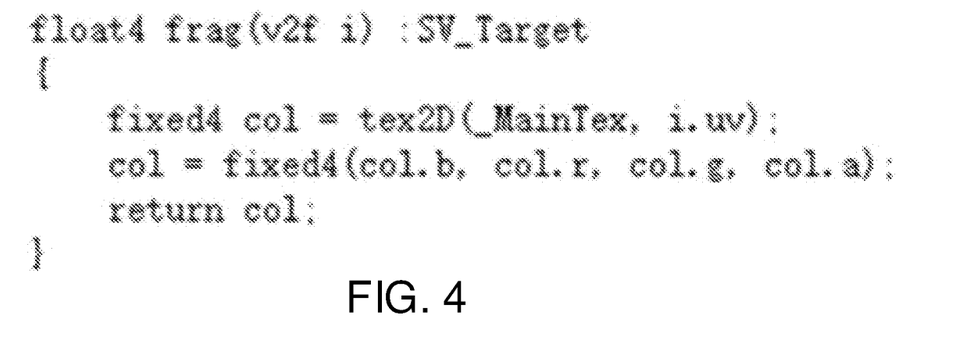
FIG. 4 is an exemplary section of codes in a shader for treating image data in the second pixel arrangement according to some embodiments of the present disclosure.

Furthermore, the method for real-time processing image data based on the rendering engine includes a step of creating a first shader associated with the first pixel arrangement and a second shader associated with the second pixel arrangement. As used herein, the term "shader" refers to a part of software codes under one or more image processors including the rendering engine, based on which the information about colors, textures, and meshes is added to images under a rendering process executed by the rendering engine. FIG. 4 is an exemplary section of codes in a shader for treating image data in the second pixel arrangement according to some embodiments of the present disclosure. Optionally, the first shader is created to define one or more programmable treatments on image data in the first pixel arrangement in which each row of pixels is arranged in real RGB subpixel order. Optionally, the second shader is created to define one or more programmable treatments on image data in the second pixel arrangement in which each odd numbered row of pixels is kept at real RGB subpixel order as in the first pixel arrangement and each even numbered row of pixels is changed to BRG subpixel order and each subpixel of one color in the even numbered row is shifted to a position between two nearest subpixels of two different colors in the odd numbered row.

As described earlier, the image data designated for a display screen in a first or regular pixel arrangement needs to be processed to convert image data to be displayed on a display screen in a second or a BV3 pixel arrangement. In an embodiment, once the FBX files are loaded to the rendering engine, the rendering engine is operated to perform a rendering process to the virtual images encoded in the FBX files. Optionally, the first virtual image associated with the first model is rendered by the rendering engine. The second virtual image associated with the second model is rendered by the rendering engine. Referring to FIG. 1 again, the method further includes a step of processing the second set of data by the rendering engine using the first shader to output a fourth set of data and a step of processing the third set of data by the rendering engine using the second shader to output a fifth set of data. Optionally, the first shader and the second shader are respectively utilized during the image rendering process to treat respective second set of data and the third set of data to adjust color, texture, and mesh information thereof.

Figure 5:
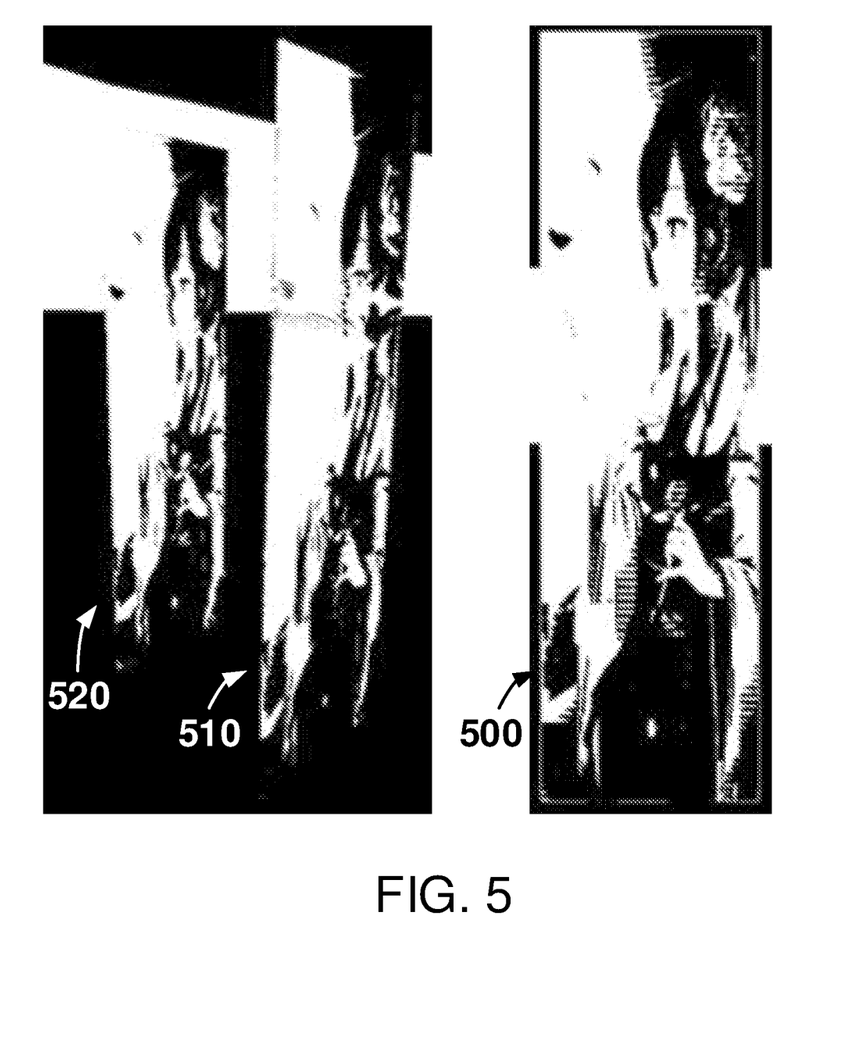
FIG. 5 is a schematic diagram showing virtual images generated in a rendering engine according to some embodiments of the present disclosure.

FIG. 5 is a schematic diagram showing virtual images generated in a rendering engine according to some embodiments of the present disclosure. Referring to FIG. 5, in order to finish a BV3 image treatment, which ultimately converts original image data to be displayed on a screen with pixels in a first pixel arrangement to converted image data to be displayed on a screen with pixels in a second pixel arrangement, two models are needed. As shown in FIG. 5, a first sample image 510 is generated based on the first model 310 (see FIG. 3) using the first shader to treat the second set of data to obtain a fourth set of data during the rendering process, which is an image placed at a front position among two images listed in a 3D perspective view to the left of FIG. 5. The first shader is associated with the first pixel arrangement in which each row of pixels is in a regular RGB subpixel order. Since the first mode 310 includes all rectangular stripe bodies (real physical body) being placed at positions in alignment with only all odd numbered rows of pixels (e.g., the part over positions in alignment with even numbered rows of pixels are empty), the first sample image 510 is actually displayed by those odd numbered rows of pixels only. At the same time, a second sample image 520 is generated based on the second model 320 (see FIG. 3) using the second shader to treat the third set of data to obtain a fifth set of data during the rendering process. The second sample image 520 is placed at a back position among two images listed in the 3D perspective view to the left of FIG. 5. The second shader is associated with the second pixel arrangement of BV3 pixel arrangement in which the odd numbered rows of pixels are still in RGB subpixel order, but the even numbered rows of pixels are changed to BRG subpixel order and relatively shifted laterally by a partial pixel length to form a substantial triangle shaped pixel compared with regular linear-shaped pixel. The color, texture, etc information are also optimized among all neighboring pixels in such re-arranged pixel arrangement through the second shader. As a result, the second sample image 520 is displayed by all odd numbered rows and even numbered rows of pixels in the second pixel arrangement.

Referring to FIG. 1 again, the method includes a step of superimposing the fourth set of data over the fifth set of data to obtain a sixth set of data. In particular, the rendering engine is employed to perform superimposing the first sample image 510 at front over the second sample image 520 at back. The superimposed image 500 is an image superimposed the first sample image 510 over the second sample image 520 in a 2D perspective view to the right of FIG. 5. Effectively, the image data associated with odd numbered rows of pixels in the first sample image override the image data associated with odd numbered rows of pixels in the second sample image. Since in the first sample image 510 the even numbered rows of pixels are not shown at all, the superimposing the first sample image 510 over the second sample image 520 retains all even numbered rows of pixels in the second sample image. In other words, the sixth set of data is made by all odd numbered rows of pixels from the fourth set of data which is in the RGB subpixel order and all even numbered rows of pixels from the fifth set of data which is in the BRG subpixel order and in relatively shifted position, in which all pixels are in the second pixel arrangement.

Figure 6:
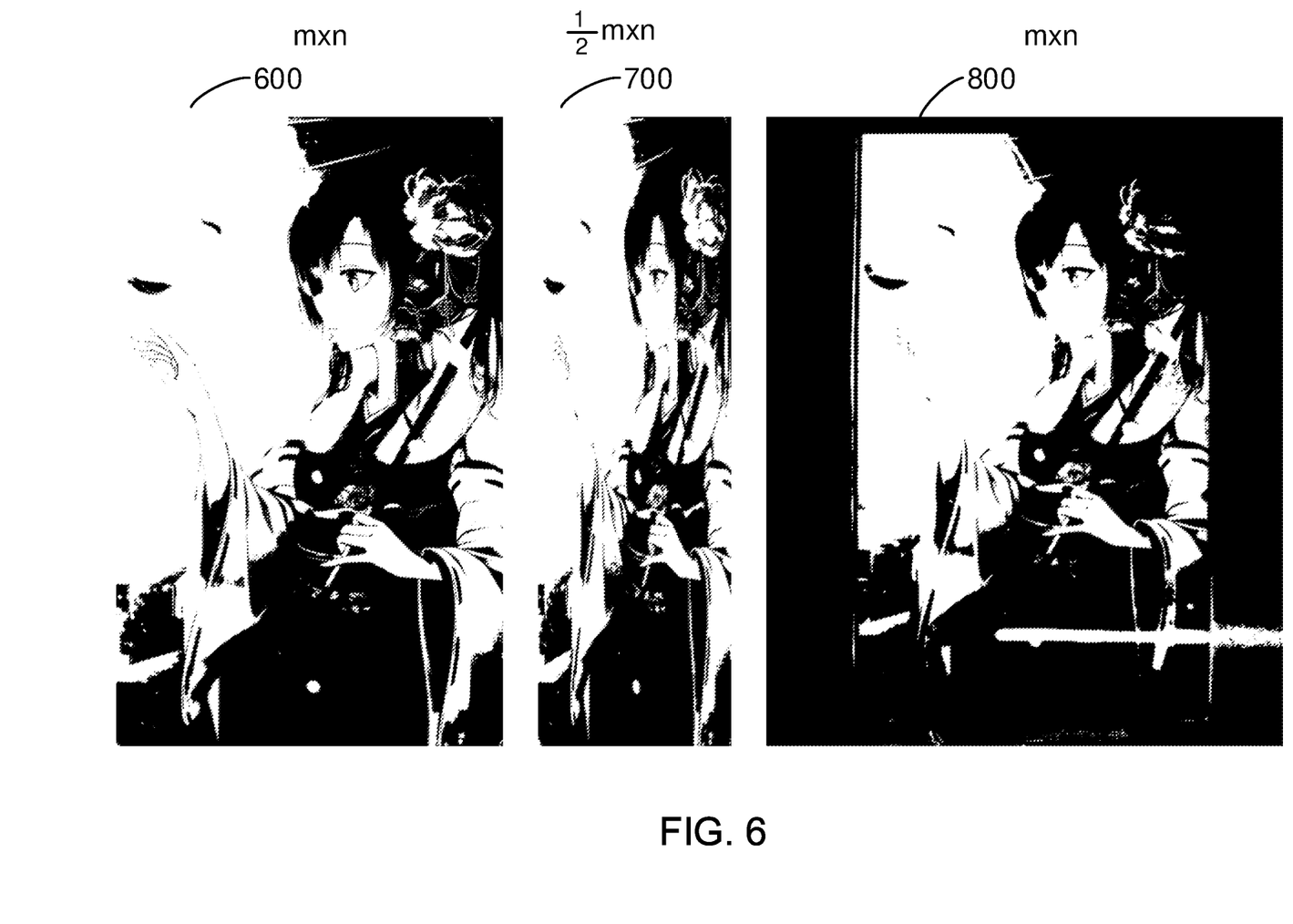
FIG. 6 is an exemplary diagram showing an original image displayed with the first pixel arrangement, a sample image in the second pixel arrangement produced by the rendering engine, and an image displayed in the display screen by lighting up the sampling image according to the embodiment of the present disclosure.

Optionally, the rendering engine further includes at least a sampling camera to sample the sixth set of data in terms of a virtual image outputted by the rendering engine. Moreover, the method includes a step of sending the sixth set of data to the display screen with pixels in the second arrangement to display the image. FIG. 6 shows an exemplary diagram of an original image displayed with the first pixel arrangement, a sample image in the second pixel arrangement produced by the rendering engine, and an image displayed in the display screen by lighting up the sampling image according to the embodiment of the present disclosure. Referring to FIG. 6, an original image 600 is displayed with the first pixel arrangement with a display resolution described by m×n pixels. Also, a virtual image 700 is shown in the middle, which is subjected to the BV3 process by the rendering engine based on the method described herein and outputted as an image made by ½·m×n pixels in the BV3 pixel arrangement. To the right of FIG. 6, a displayed image 800 with a display resolution corresponding to m×n pixels is displayed by a display screen with the BV3 pixel arrangement after the image data associated with the virtual image 700 is loaded and lightened up in the display screen. It is merely an example showing that method disclosed herein is effectively able to provide real-time processing to the image data to be displayed in the display screen with altered pixel arrangement.

In another aspect, the present disclosure provides a real-time image processing apparatus associated with a display panel or screen that has an altered pixel arrangement. The real-time image processing apparatus includes a memory and one or more processors. The memory and the one or more processors are connected with each other. The connection may be through a network, such as a wireless network, a wired network, and/or any combination of a wireless network and a wired network. The network may include a local area network, the internet, a telecommunications network (Internet of Things), and/or any combination of the above-networks, etc. The wired network can communicate by means of twisted pair, coaxial cable or optical fiber transmission. A wireless communication network such as 3G/4G/5G mobile communication network, Bluetooth, Zigbee or Wi-Fi can be used. The memory stores computer-executable instructions for controlling the one or more processors. The memory may include static random-access memory (SRAM), electrically erasable programmable read-only memory (EEPROM), erasable programmable read-only memory (EPROM), read-only memory (ROM), magnetic memory, flash memory, disk, or optical disk. In an embodiment, one or more computer-executable instructions control the one or more processors to sample a first set of data in a first (regular) pixel arrangement to be displayed as an image in a display screen with pixels in a second (altered) pixel arrangement. In another embodiment, one or more computer-executable instructions control the one or more processors to create a first model and a second model for a rendering engine based on the display screen. In yet another embodiment, one or more computer-executable instructions control the one or more processors to map the first set of data to the first model to generate a second set of data and map the first set of data to the second model to generate a third set of data. In still another embodiment, one or more computer-executable instructions control the one or more processors to load the second set of data and the third set of data to the rendering engine. In yet still another embodiment, one or more computer-executable instructions control the one or more processors to process the second set of data by the rendering engine using a first shader associated with the first pixel arrangement to output a fourth set of data and process the third set of data by the rendering engine using a second shader associated with the second pixel arrangement to output a fifth set of data. In further another embodiment, one or more computer-executable instructions control the one or more processors to superimpose the fourth set of data over the fifth set of data to obtain a sixth set of data. The sixth set of data can be sent to the display panel or screen to be displayed as an image in the altered pixel arrangement.

Optionally, the one or more processors comprise a rendering engine, a first shader, and a second shader. The rendering engine comprises at least a sampling camera for sampling the first set of data. The rendering engine is configured to receive a first model via a first FBX file. The first model is created by an external model builder. The first FBX file is generated with information of a first virtual image attached to the first model based on the second set of data transformed from the first set of data through UV mapping. The rendering engine is also configured to receive a second model via a second FBX file. The second FBX file is generated with information of a second virtual image attached to the second model based on the third set of data transformed from the first set of data through UV mapping.

Optionally, the rendering engine includes one or more computer-executable instructions to render the second set of data to form a first virtual image based on the first model and to render the third set of data to form a second virtual image based on the second model.

Optionally, the first shader includes one or more computer-executable instructions to adjust colors, textures, and mesh information on the first virtual image to obtain the fourth set of data in the first pixel arrangement in which each row of pixels is arranged in real RGB subpixel order. The second shader includes one or more computer-executable instructions to adjust colors, textures, and mesh information on the second virtual image to obtain the fifth set of data in the second pixel arrangement. In the second pixel arrangement, in a specific embodiment, a number of pixels in each row is half of the number of pixels in each row in the first pixel arrangement. Each odd numbered row of pixels is kept at real RGB subpixel order as in the first pixel arrangement. Each subpixel of one color in the even numbered row is shifted to a position between two subpixels of two different colors in the odd numbered row.

Optionally, the one or more processors further includes one or more computer-executable instructions to superimpose the fourth set of data over the fifth set of data to produce a sample image with all odd numbered rows of pixels produced by the fourth set of data and all even numbered rows of pixels produced by the fifth set of data. The sixth set of data is outputted to the display screen in the second pixel arrangement to display an image with a lateral display resolution being two times of a physical resolution of the second number of pixels per row and a vertical display resolution being same as a physical resolution of the first number of rows of pixels in the display screen.

In one embodiment, the one or more processors include a central processing unit (CPU) or a field-programmable logic array (FPGA), a microcontroller (MCU), a digital signal processor (DSP), an application-specific integrated circuit (ASIC), or a graphics processing unit (GPU) having processing power and/or program execution capability. One or more processors may be configured to form a processor group to simultaneously execute the above-described rendering method. Alternatively, some of the processors perform partial steps of the above-described rendering method, and some of the processors perform other partial steps of the above-described rendering methods.

In yet another aspect, the present disclosure provides a display apparatus including a display screen coupling to the real-time image processing apparatus described herein. The display apparatus is one selected from a VR/AR displayer, a smart phone, a notebook computer, a laptop computer, a TV, a displayer, a digital picture frame, a GPS device, and any product having a display function described herein.

In still another aspect, the present disclosure provides a computer product comprising a non-transitory tangible computer-readable medium having computer-readable instructions thereon. The computer-readable instructions are executable by a processor to cause the processor to perform sampling a first set of data in a first pixel arrangement to be displayed in real time as an image in a display screen with pixels in a second pixel arrangement; mapping the first set of data to a first model for a rendering engine to generate a second set of data; mapping the first set of data to a second model for the rendering engine to generate a third set of data; loading the second set of data and the third set of data to the rendering engine; processing the second set of data by the rendering engine using a first shader associated with the first pixel arrangement to output a fourth set of data; processing the third set of data by the rendering engine using a second shader associated with the second pixel arrangement to output a fifth set of data; and superimposing the fourth set of data over the fifth set of data to obtain a sixth set of data.

Optionally, the computer-readable instructions are preloaded into a rendering engine associated with a display panel or screen of a display apparatus.

In an alternative embodiment, the present disclosure provides a method for real-time processing image data based on a rendering engine for displaying an image on a display panel configured with a first pixel arrangement based on data supplied with a second pixel arrangement. Optionally, the display panel is one belonging to a virtual reality display apparatus. The method includes creating a display model based on a display panel configured with a first pixel arrangement for a rendering engine that is built in the display panel and a shader associated with the rendering engine for writing data with the first pixel arrangement. Optionally, the display model can be created separately using an external model-builder software based on a 3D geometric shape of the display panel configured with the first pixel arrangement. Optionally, creating the display model includes setting up a pixel-conversion map onto the display model for converting the second pixel arrangement to the first pixel arrangement. Optionally, the display model including the pixel-conversion map is loaded into the rendering engine. Further, the method includes sampling a first set of image data with a second pixel arrangement in real time from a scene based on the first set of image data in the rendering engine. As the first set of image data is supplied into the rendering engine as a virtual scene therein, the first set of image data is sampled using an internal camera associated with the rendering engine. Additionally, the method includes rendering the image data based on the display model by the rendering engine and the shader to obtain a second set of image data with the first pixel arrangement. Furthermore, the method includes sampling the second set of image data with the first pixel arrangement in real time from a scene based on the second set of image data in the rendering engine. Again, the second set of image data can be collected using the internal camera associated with the rendering engine. Moreover, the method includes outputting the second set of image data from the rendering engine to the display panel to display an image with the first pixel arrangement.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for real-time processing image data based on a rendering engine comprising:

sampling a first set of data in a first pixel arrangement to be displayed as an image in a display screen with pixels in a second pixel arrangement;

mapping the first set of data to a first model for a rendering engine to generate a second set of data;

mapping the first set of data to a second model for the rendering engine to generate a third set of data;

loading the second set of data and the third set of data to the rendering engine;

processing the second set of data by the rendering engine using a first shader associated with the first pixel arrangement to output a fourth set of data;

processing the third set of data by the rendering engine using a second shader associated with the second pixel arrangement to output a fifth set of data;

superimposing the fourth set of data over the fifth set of data to obtain a sixth set of data; and displaying the sixth set of data in the display screen with pixels in the second pixel arrangement.

2. The method of claim 1, further comprising creating the first model and the second model for the rendering engine based on the display screen;

wherein creating the first model comprises generating a first number of rectangular stripe bodies each having a first width of a pixel and a first length of one row of second number of pixels and being separated from neighboring rectangular stripe body by one row of pixels, wherein the first number and the second number respectively represent half of a vertical display resolution and half of a lateral display resolution associated with the display screen; wherein the second model is characterized by a rectangular body corresponding to the display screen with a second width equal to the first length of one row of pixels and a second length equal to a sum of first widths of two times of the first number of rows of pixels.

3. The method of claim 1, wherein sampling the first set of data comprises collecting the first set of data in real time using a sampling camera associated with the rendering engine.

4. The method of claim 3, wherein the sampling camera comprises an orthogonal projection camera or a perspective projection camera.

5. The method of claim 2, wherein mapping the first set of data to the first model to generate the second set of data comprises generating a first virtual image with a first edge aligned with a first one of the first number of rectangular stripe bodies of the first model by transforming the first set of data to the second set of data in terms of UV mapping; mapping the first set of data to the second model to generate the third set of data comprises generating a second virtual image attached to a single rectangular body of the second model by transforming the first set of data to the third set of data in terms of UV mapping.

6. The method of claim 5, wherein loading the second set of data and the third set of data to the rendering engine comprises generating a first Filmbox (FBX) file bearing at least information of the second set of data associated with the first model and a second FBX file bearing at least information of the third set of data associated with the second model respectively loaded into the rendering engine.

7. The method of claim 6, further comprising creating the first shader associated with the first pixel arrangement;

wherein creating the first shader comprises defining one or more computer-executable treatments on image data in the first pixel arrangement in which each row of pixels is arranged in real RGB subpixel order.

8. The method of claim 7, wherein processing the second set of data comprises rendering the first virtual image by the rendering engine; and adjusting colors, textures, and mesh information on the second set of data associated with the first model by the first shader to obtain the fourth set of data in the first pixel arrangement.

9. The method of claim 6, further comprising creating the second shader associated with the second pixel arrangement; wherein creating the second shader comprises defining one or more computer-executable treatments on image data in the second pixel arrangement in which a number of each row of pixels is half of that in the first pixel arrangement, each odd numbered row of pixels is kept at real RGB subpixel order as in the first pixel arrangement, and each even numbered row of pixels is changed to BRG subpixel order and each subpixel of one color in the even numbered row is shifted to a position between two nearest subpixels of two different colors in the odd numbered row.

10. The method of claim 9, wherein processing the third set of data comprises rendering the second virtual image by the rendering engine; and adjusting colors, textures, and mesh information on the third set of data associated with the second model by the second shader to obtain the fifth set of data in the second pixel arrangement.

11. The method of claim 1, wherein superimposing the fourth set of data over the fifth set of data to obtain a sixth set of data comprises combining all fourth set of data in odd numbered rows of pixels and all fifth set of data in even numbered rows of pixels to effectively obtain the sixth set of data to generate a virtual scene in the rendering engine; and sampling the sixth set of data in the second pixel arrangement out of the virtual scene in real time using a sampling camera associated with the rendering engine.

12. The method of claim 1, wherein displaying the sixth set of data in the display screen comprises sending the sixth set of data in the second pixel arrangement with half lateral display resolution of the display screen and displaying an image in the display screen with full display resolution.

13. A real-time image processing apparatus, comprising:
a memory; and
one or more processors;
wherein the memory and the one or more processors are connected with each other; and
the memory stores computer-executable instructions for controlling the one or more processors to:
sample a first set of data in a first pixel arrangement to be displayed as an image in a display screen with pixels in a second pixel arrangement;
map the first set of data to a first model for a rendering engine to generate a second set of data;
map the first set of data to a second model for the rendering engine to generate a third set of data;
load the second set of data and the third set of data to the rendering engine;
process the second set of data by the rendering engine using a first shader associated with the first pixel arrangement to output a fourth set of data;
process the third set of data by the rendering engine using a second shader associated with the second pixel arrangement to output a fifth set of data; and
superimpose the fourth set of data over the fifth set of data to obtain a sixth set of data.

14. The real-time image processing apparatus of claim 13, wherein the one or more processors comprise a rendering engine, a first shader, and a second shader, wherein the rendering engine comprises at least a sampling camera for sampling the first set of data, and is configured to receive a first model via a first Filmbox (FBX) file, wherein the first model is created by an external model builder and the first FBX file includes information of a first virtual image attached to the first model based on the second set of data transformed from the first set of data through UV mapping; and to receive a second model via a second FBX file, wherein the second FBX file includes a second virtual image attached to the second model based on the third set of data transformed from the first set of data through UV mapping.

15. The real-time image processing apparatus of claim 14, wherein the first model is generated by the external model builder based on a rectangular body corresponding to the display screen as a first number of rectangular stripe bodies each having a first width of a pixel and a first length of one row of second number of pixels and being separated from neighboring rectangular stripe body by one row of pixels; the second model is characterized by a rectangular body corresponding to the display screen with a second width equal to the first length of one row of pixels and a second length equal to a sum of first widths of two times of the first number of rows of pixels; wherein the first number and the second number respectively represent half of a vertical display resolution and half of a lateral display resolution associated with the display screen.

16. The real-time image processing apparatus of claim 14, wherein the rendering engine comprises one or more computer-executable instructions to render the second set of data to form a first virtual image based on the first model and to render the third set of data to form a second virtual image based on the second model.

17. The real-time image processing apparatus of claim 16, wherein the first shader comprises one or more computer-executable instructions to adjust colors, textures, and mesh information on the first virtual image to obtain the fourth set of data in the first pixel arrangement in which each row of pixels is arranged in real RGB subpixel order; wherein the second shader comprises one or more computer-executable instructions to adjust colors, textures, and mesh information on the second virtual image to obtain the fifth set of data in the second pixel arrangement in which a number of each row of pixels is half of that in the first pixel arrangement, each odd numbered row of pixels is kept at real RGB subpixel order as in the first pixel arrangement, and each subpixel of one color in an even numbered row is shifted to a position between two subpixels of two different colors in the odd numbered row.

18. The real-time image processing apparatus of claim 15, wherein the one or more processors further comprises one or more computer-executable instructions to superimpose the fourth set of data over the fifth set of data to produce a sample image with all odd numbered rows of pixels produced by the fourth set of data and all even numbered rows of pixels produced by the fifth set of data; and to output the sixth set of data to the display screen in the second pixel arrangement to display an image with a lateral display resolution being two times of a physical resolution of the second number of pixels per row and a vertical display resolution being same as a physical resolution of the first number of rows of pixels in the display screen.

19. A display apparatus comprising a display screen coupling to the real-time image processing apparatus according to claim 13.

20. A computer product comprising a non-transitory tangible computer-readable medium having computer-readable instructions thereon, the computer-readable instructions being executable by a processor to cause the processor to perform:
sampling a first set of data in a first pixel arrangement to be displayed in real time as an image in a display screen with pixels in a second pixel arrangement;
mapping the first set of data to a first model for a rendering engine to generate a second set of data;

mapping the first set of data to a second model for the rendering engine to generate a third set of data;
loading the second set of data and the third set of data to the rendering engine;
processing the second set of data by the rendering engine using a first shader associated with the first pixel arrangement to output a fourth set of data;
processing the third set of data by the rendering engine using a second shader associated with the second pixel arrangement to output a fifth set of data; and
superimposing the fourth set of data over the fifth set of data to obtain a sixth set of data.

\* \* \* \* \*